(12) United States Patent
McDaniel

(10) Patent No.: US 8,403,342 B1
(45) Date of Patent: Mar. 26, 2013

(54) BICYCLE SKI ATTACHMENT ASSEMBLY

(76) Inventor: Royce A. McDaniel, Hendricks, MN (US)

(*) Notice: Subject to any disclaimer, the term of this patent is extended or adjusted under 35 U.S.C. 154(b) by 0 days.

(21) Appl. No.: 13/171,015

(22) Filed: Jun. 28, 2011

(51) Int. Cl.
*A63C 17/18* (2006.01)
*B62K 13/00* (2006.01)
(52) U.S. Cl. ............... 280/7.12; 280/7.17; 280/21.1
(58) Field of Classification Search .......... 280/7, 16, 280/20, 21.1, 14.25, 14.28, 287, 12.13–12.14, 280/845, 278, 87.041, 87.05, 87.06, 7.12
See application file for complete search history.

(56) References Cited

U.S. PATENT DOCUMENTS

| | | | |
|---|---|---|---|
| 3,884,484 A * | 5/1975 | Uhlyarik | 280/7.12 |
| 4,168,841 A | 9/1979 | Uhlyarik | |
| 5,102,153 A | 4/1992 | Rhode | |
| 6,164,670 A | 12/2000 | Abarca et al. | |
| 6,279,923 B1 | 8/2001 | Cardillo, Jr. et al. | |
| 6,416,062 B1 | 7/2002 | Scatchard | |
| 6,554,294 B2 | 4/2003 | Laudon | |
| 6,736,414 B2 * | 5/2004 | Farrally-Plourde | 280/16 |
| 6,994,359 B1 * | 2/2006 | Silver | 280/16 |
| 7,547,023 B2 * | 6/2009 | Yau | 280/16 |
| 2008/0029324 A1 * | 2/2008 | Plankenhorn | 180/190 |
| 2009/0033047 A1 * | 2/2009 | Paganoni | 280/14.28 |
| 2009/0230641 A1 | 9/2009 | Eugenio | |
| 2010/0264612 A1 * | 10/2010 | Paganoni | 280/16 |

* cited by examiner

*Primary Examiner* — John Walters
*Assistant Examiner* — James Triggs

(57) ABSTRACT

A bicycle ski attachment assembly provides a ski vehicle that positions a rider similar to being on a conventional bicycle including similar rider height and movable pedals. The assembly includes an elongated front ski and an elongated rear ski. A front ski support has a front hub. A front axle assembly is coupled to the front hub and is configured for coupling to front forks of a bicycle. A rear ski support has a rear hub. A rear axle assembly is coupled to the rear hub and is configured for coupling to rear dropouts of the bicycle. A chain pulley is coupled to the rear axle assembly. The chain pulley is configured for receiving a chain from the bicycle under tension whereby the chain pulley provides resistance to pedaling pedals on the bicycle.

11 Claims, 9 Drawing Sheets

BICYCLE SKI ATTACHMENT ASSEMBLY

BACKGROUND OF THE DISCLOSURE

Field of the Disclosure

The disclosure relates to ski attachment devices and more particularly pertains to a new ski attachment device for providing a ski vehicle that positions a rider similar to being on a conventional bicycle including rider height and movable pedals.

SUMMARY OF THE DISCLOSURE

An embodiment of the disclosure meets the needs presented above by generally comprising an elongated front ski and an elongated rear ski. A front ski support has a front hub. A front axle assembly is coupled to the front hub and is configured for coupling to front forks of a bicycle. A rear ski support has a rear hub. A rear axle assembly is attached to the rear hub and is configured for coupling to rear dropouts of the bicycle. A chain pulley is coupled to the rear axle assembly and is configured for receiving a chain from the bicycle under tension whereby the chain pulley provides resistance to pedaling pedals on the bicycle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
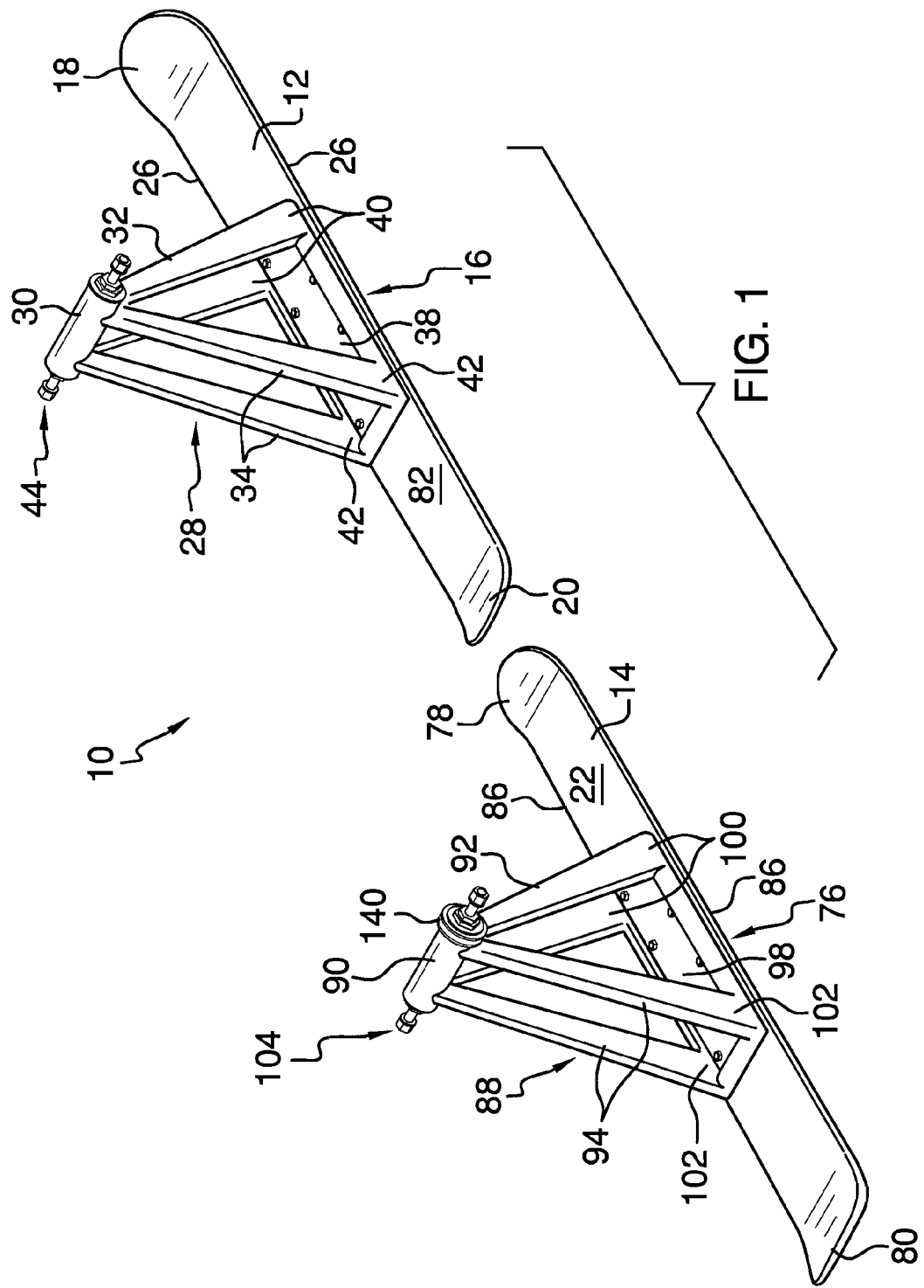
FIG. 1 is a top rear side perspective view of a bicycle ski attachment assembly according to an embodiment of the disclosure.
Figure 2:
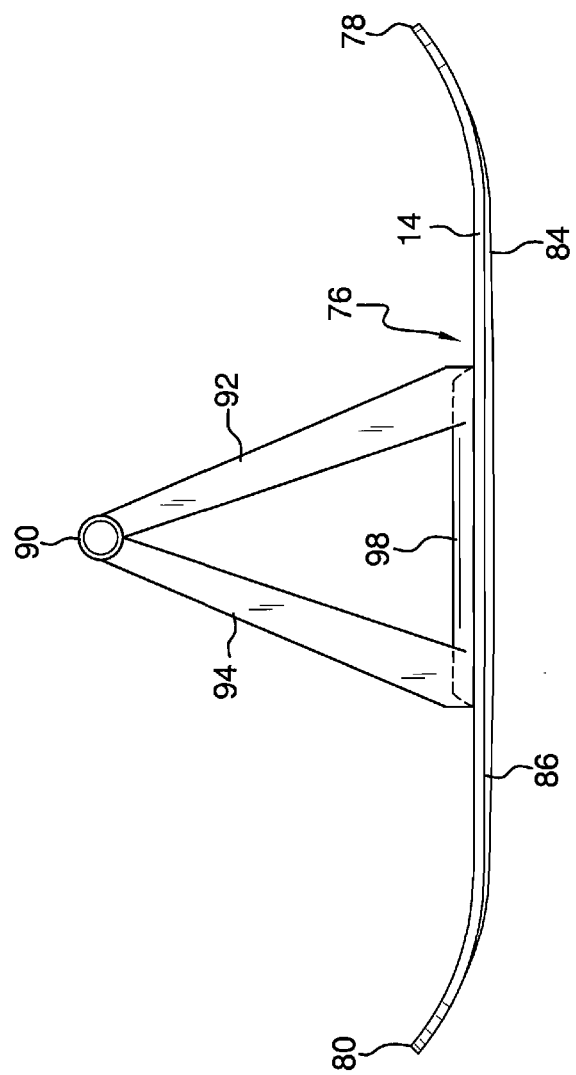
FIG. 2 is a side view of a ski attachment of an embodiment of the disclosure.
Figure 3:
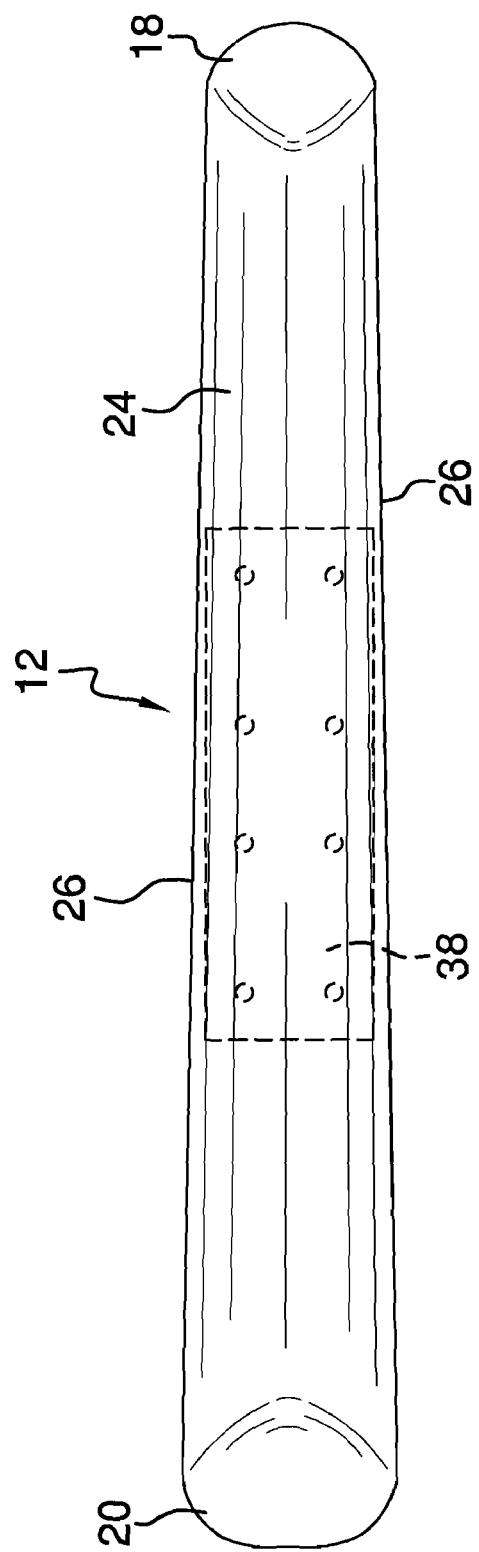
FIG. 3 is a bottom view of a ski attachment of an embodiment of the disclosure.
Figure 4:
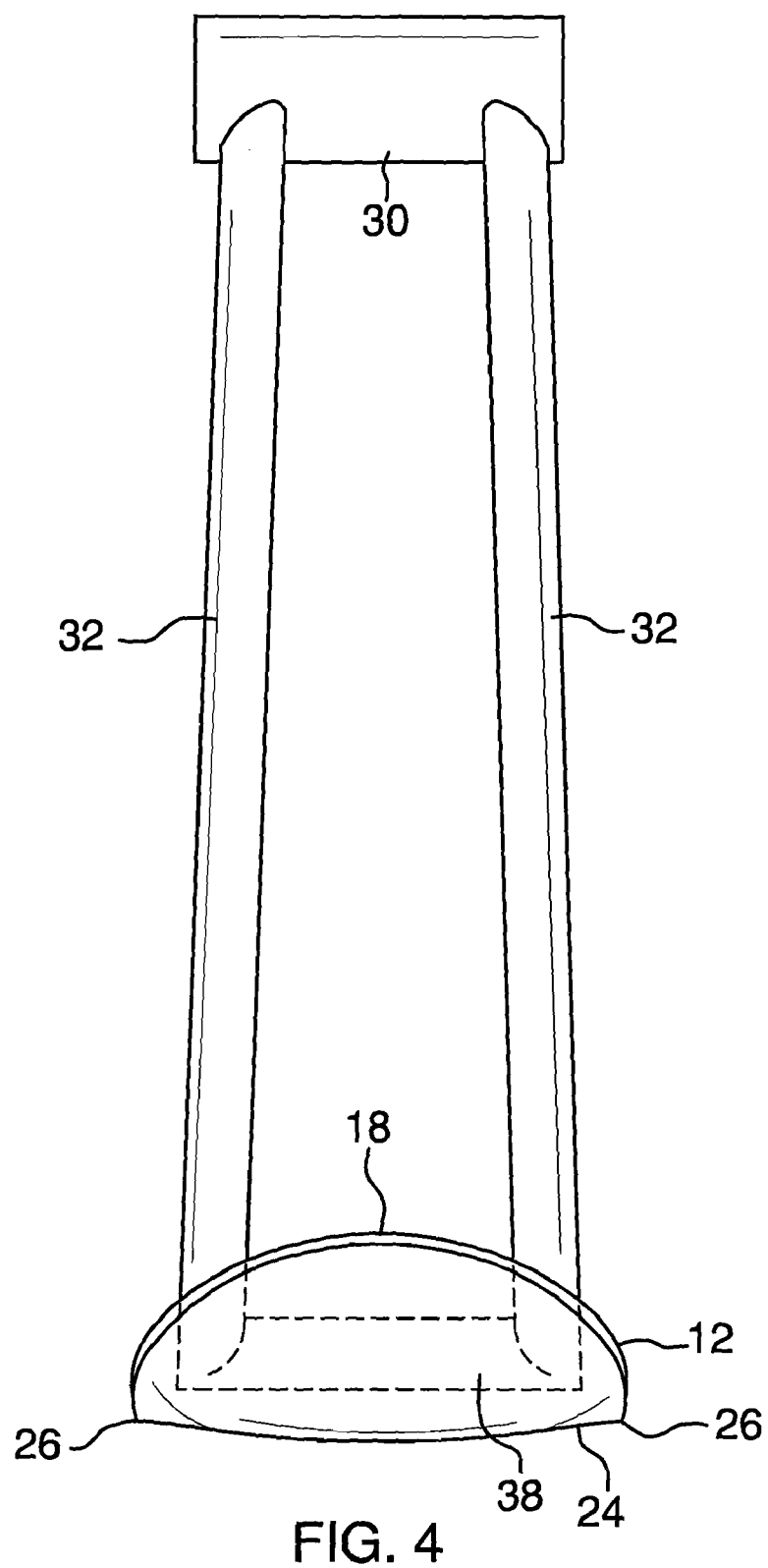
FIG. 4 is a front view of a ski attachment of an embodiment of the disclosure.
Figure 5:
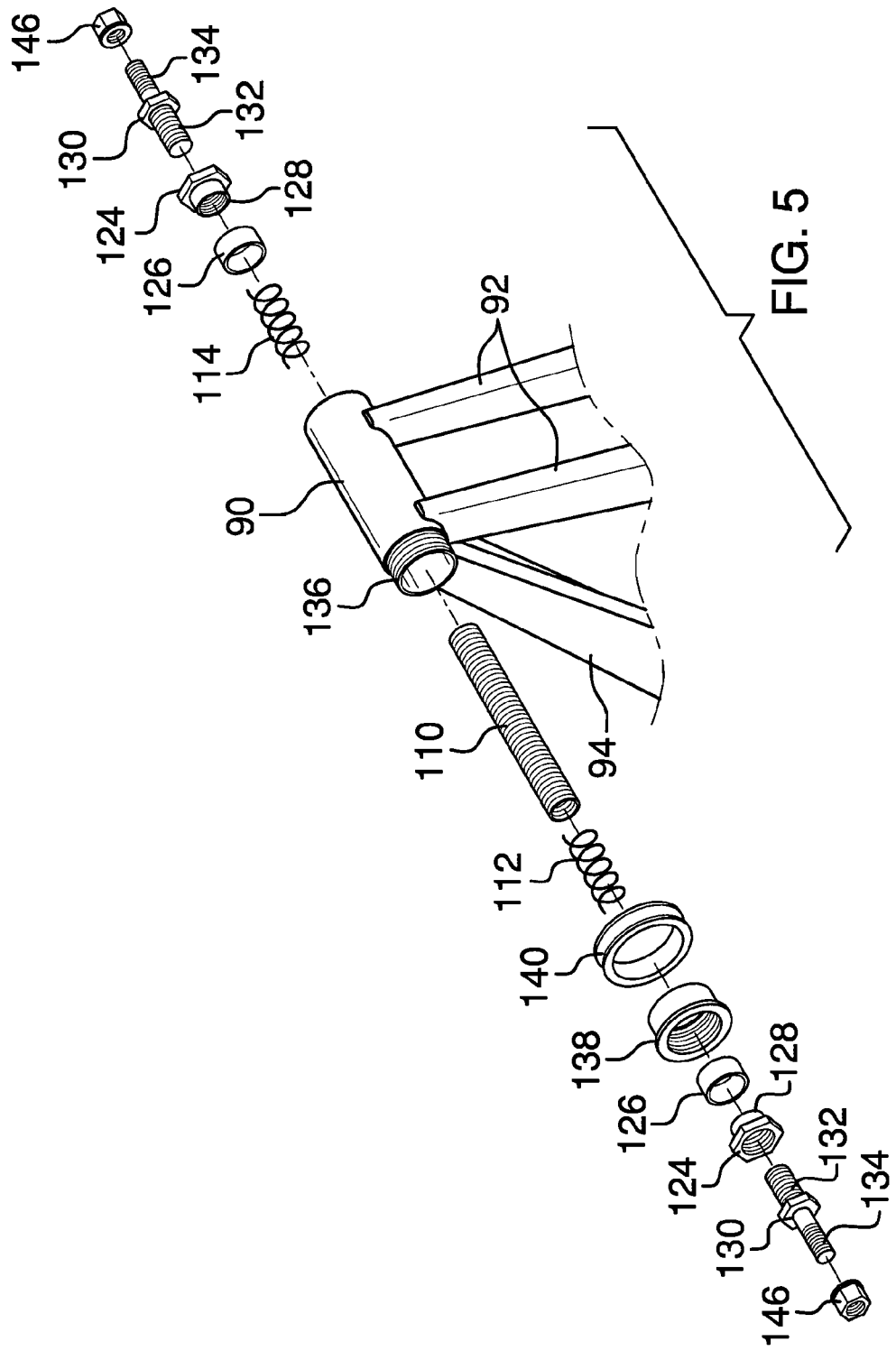
FIG. 5 is an exploded view of a rear hub assembly of an embodiment of the disclosure.
Figure 6:
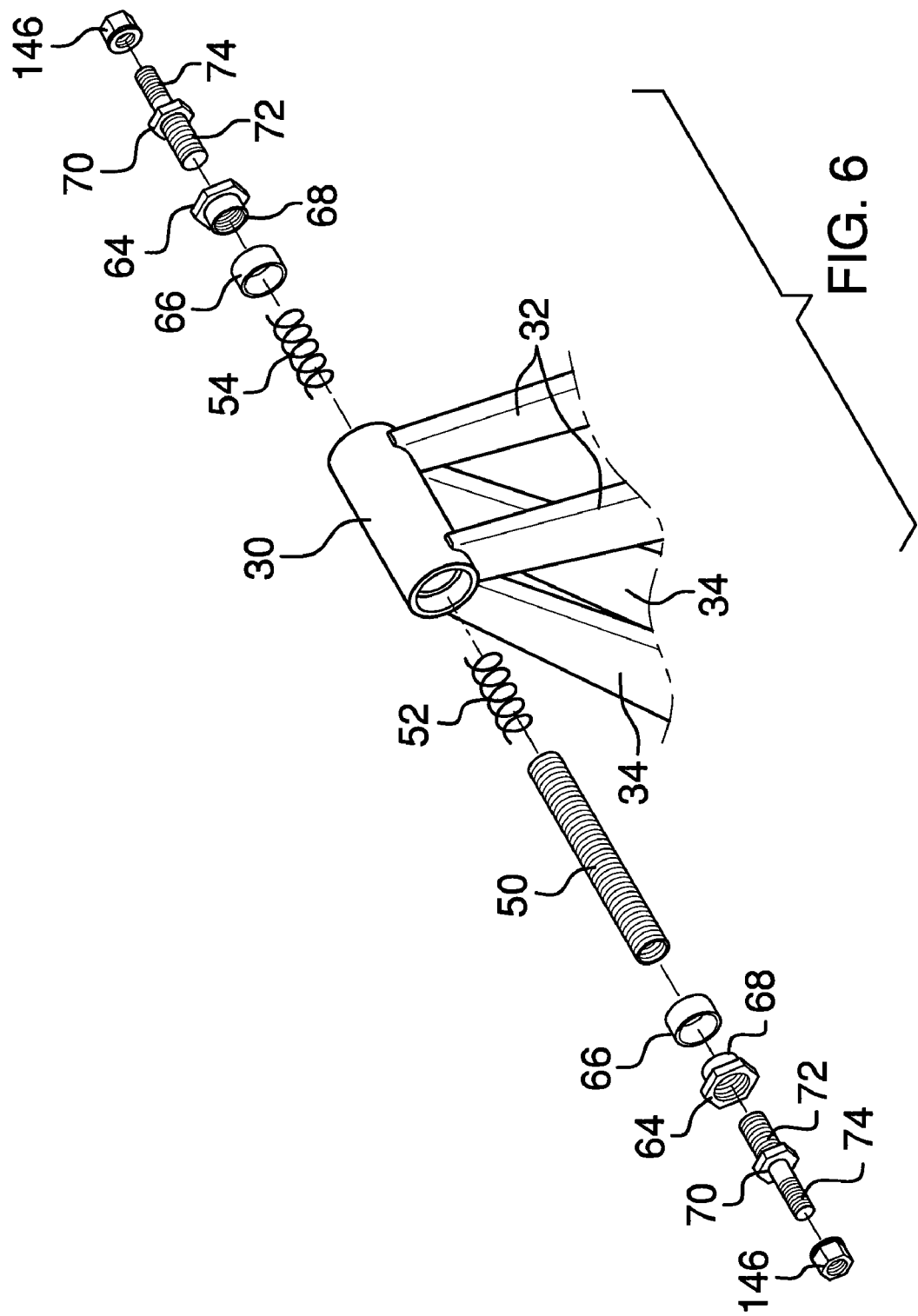
FIG. 6 is an exploded view of a front hub assembly of an embodiment of the disclosure.
Figure 7:
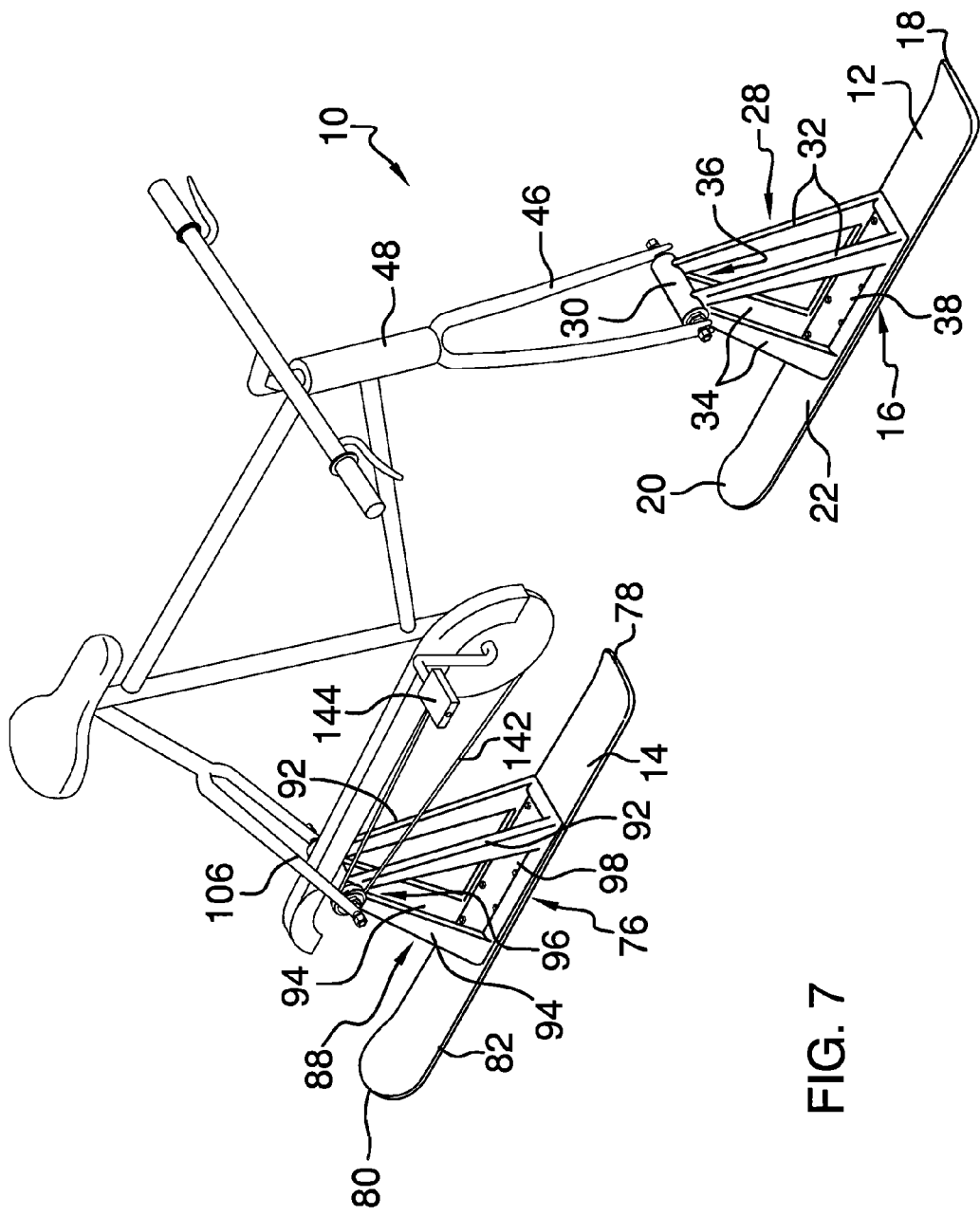
FIG. 7 is a top front side perspective view of an embodiment of the disclosure.
Figure 8:
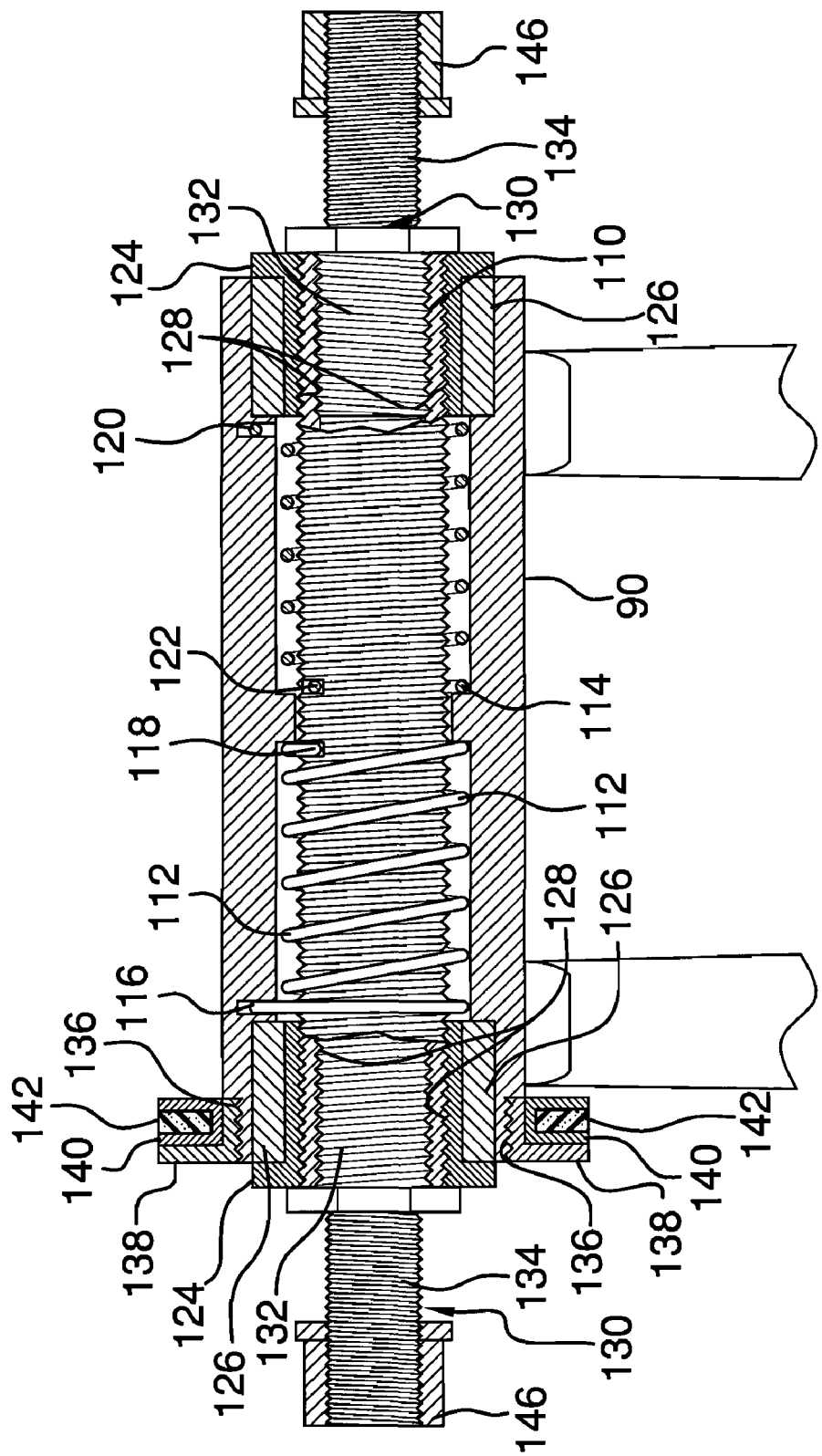
FIG. 8 is a cross-sectional view of an embodiment of the disclosure taken along line 8-8 of FIG. 7.
Figure 9:
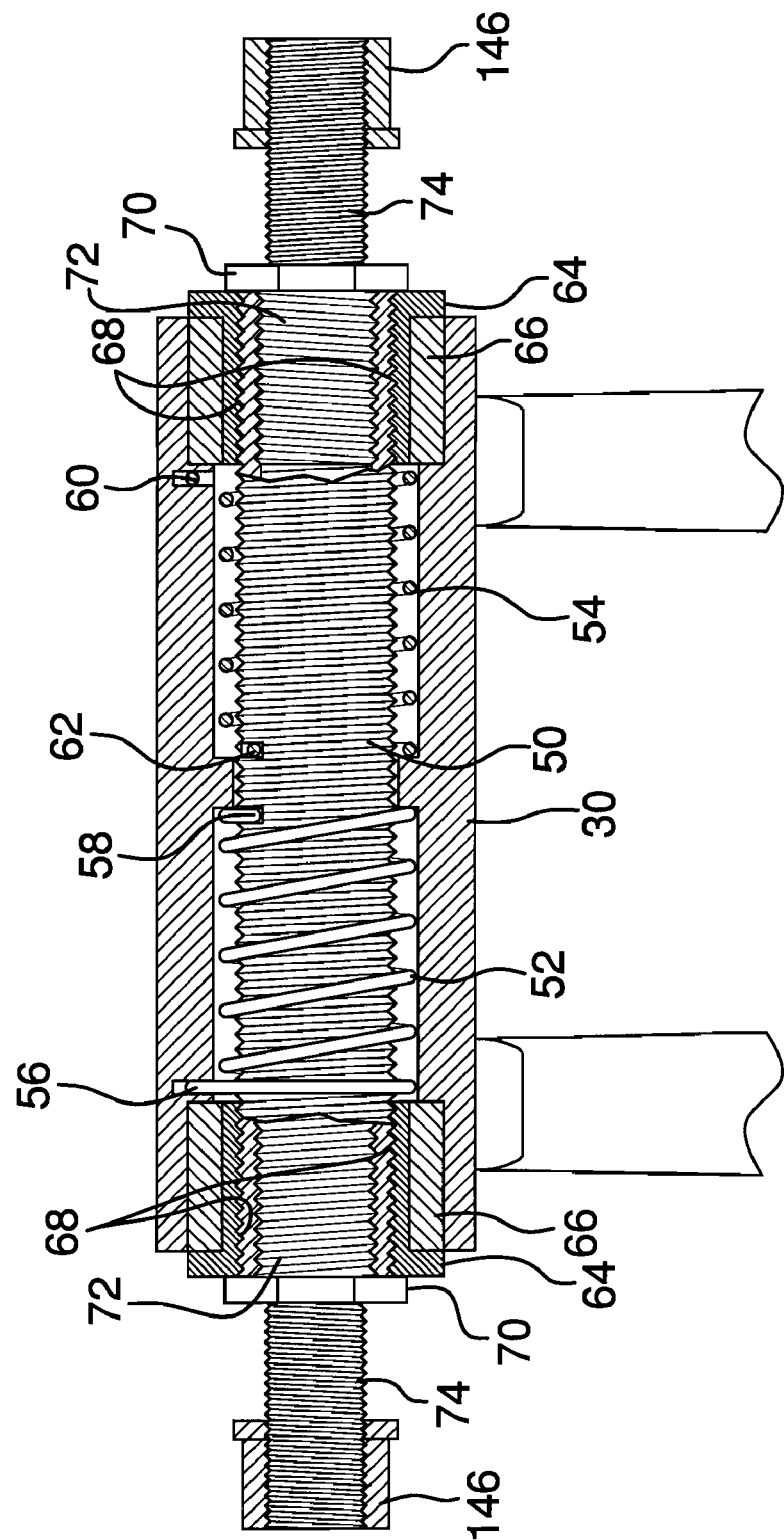
FIG. 9 is a cross-sectional view of an embodiment of the disclosure taken along line 9-9 of FIG. 7.

With reference now to the drawings, and in particular to FIGS. 1 through 9 thereof, a new ski attachment device embodying the principles and concepts of an embodiment of the disclosure and generally designated by the reference numeral 10 will be described.

As best illustrated in FIGS. 1 through 9, the bicycle ski attachment assembly 10 generally comprises an elongated front ski 12 and an elongated rear ski 14. The front ski 12 has a medial portion 16 positioned between an upturned forward portion 18 and an upturned rear portion 20. The medial portion 16 of the front ski 12 has a planar upper surface 22. The front ski 12 also has a curved bottom surface 24 extending between two elongated side edges 26. Each of the elongated side edges 26 of the front ski 12 is configured for selectively carving into snow in the same manner as the edges of a conventional snow board.

A front ski support 28 includes a front hub 30. The front ski support 28 also includes a pair of coplanar front posts 32 extending from the front hub 30 and a pair of coplanar rear posts 34 extending from the front hub 30. The rear posts 34 form an acute angle 36 extending away from the front hub 30 with respect to the front posts 32. The front ski support 28 also includes a base 38 extending between distal ends 40 of the front posts 32 relative to the front hub 30 and distal ends 42 of the rear posts 34 relative to the front hub 30. The base 38 is coupled to the planar upper surface 22 of the medial portion 16 of the front ski 12.

A front axle assembly 44 is coupled to the front hub 30. The front axle assembly 44 is configured for coupling to front forks 46 of a bicycle 48. The front axle assembly 44 includes a front axle 50 positioned in and extending through the front hub 30, a first spring 52 coupled to the front axle 50, and a second spring 54 coupled to the front axle 50. The first spring 52 has a first end 56 abutting the front axle 50 and a second end 58 abutting the front hub 30. Thus, the first spring 52 inhibits rotation of the front hub 30 relative to the front axle 50 in a first direction relative to the bicycle 48. Similarly, the second spring 54 has a first end 60 abutting the front axle 50 and a second end 62 abutting the front hub 30 whereby the second spring 54 inhibits rotation of the front hub 30 relative to the front axle 50 in a second direction. Thus, the first spring 52 and second spring 54 inhibit forward and backward pivoting of the front ski support 28 relative to the bicycle 48.

The front axle assembly 44 further includes a pair of front axle nuts 64 coupled to the front axle 50 and engaging the front hub 30 to hold the front axle 50 in a stable static position relative to the front hub 30. The front axle assembly 44 includes a pair of front bearings 66 coupled to the front axle 50 to hold the front axle 50 in place within the front hub 30. Each of the front bearings 66 is positioned between a tubular portion 68 of an associated front axle nut 64 and the front hub 30. The front axle assembly 44 includes a pair of front axle mounts 70. Each front axle mount 70 has a first end portion 72 coupled to the front axle 50 and a second end portion 74 extending outwardly from the front axle 50 through the front axle nut 64. The second end portion 74 is configured for fitting the front forks 46 of the bicycle 48. Interchangeable axle mounts 70 may be provided with varying diameter second end portions 74 to customize the front axle assembly 44 to fit varying sizes of front forks 46.

The rear ski 14 has a medial portion 76 positioned between an upturned forward portion 78 and an upturned rear portion 80. The medial portion 76 of the rear ski 14 has a planar upper surface 82 and a curved bottom surface 84 extending between two elongated side edges 86 of the rear ski 14. Each of the side edges 86 of the rear ski 14 is configured for selectively carving into snow in the same manner as the side edges 26 of the front ski 12.

A rear ski support 88 has a rear hub 90. The rear ski support 88 also includes a pair of coplanar front arms 92 extending from the rear hub 90 and a pair of coplanar rear arms 94 extending from the rear hub 90. The rear arms 94 form an acute angle 96 extending away from the rear hub 90 with respect to the front arms 92. The rear ski support 88 includes a base 98 extending between distal ends 100 of the front arms 92 relative to the rear hub 90 and distal ends 102 of the rear arms 94 relative to the rear hub 90. The base 98 of the rear ski support 88 is coupled to the planar upper surface 82 of the medial portion 76 of the rear ski 14.

A rear axle assembly 104 is coupled to the rear hub 90. The rear axle assembly 104 is configured for coupling to rear dropouts 106 of the bicycle 48. The rear axle assembly 104 has a rear axle 110 positioned in and extending through the rear hub 90. The rear axle assembly 104 includes a first coil 112 (the term "coil" herein being used to define a spring) coupled to the rear axle 110 and a second coil 114 coupled to the rear axle 110. The first coil 112 has a first end 116 abutting the rear axle 110 and a second end 118 abutting the rear hub 90. The first coil 112 inhibits rotation of the rear hub 90 relative to the rear axle 110 in a first direction. The second coil 114 has a first end 120 abutting the rear axle 110 and a second end 122 abutting the rear hub 90. The second coil 114 inhibits rotation of the rear hub 90 relative to the rear axle 110 in a second direction opposite the first direction. Thus, the rear axle assembly 88 inhibits rotation of the rear ski 14 relative to the bicycle 48.

The rear axle assembly 104 includes a pair of rear axle nuts 124 coupled to the rear axle 110 and a pair of rear bearings 126 also coupled to the rear axle 110. Each of the rear bearings 126 is positioned between a tubular portion 128 of an associated rear axle nut 124 and the rear hub 90. The rear axle assembly 104 also includes a pair of rear axle mounts 130. Each rear axle mount 130 has a first end portion 132 coupled to the rear axle 110 and a second end portion 134 extending outwardly from the rear axle 110. The second end portion 134 is configured for fitting the rear dropouts 106 of the bicycle 48 and may vary in diameter on interchangeable rear axle mounts 130 as discussed for the front axle mounts 70.

A threaded extension 136 is coupled to and extends from the rear hub 90. A pulley seat 138 is threadably coupled to the threaded extension 136. A chain pulley 140 is coupled to the rear axle assembly 88 by placement on the pulley seat 138. The chain pulley 140 is configured for receiving a chain 142 from the bicycle 48 under tension whereby the chain pulley 140 provides some resistance to pedaling pedals 144 on the bicycle 48. The chain pulley 140 is coupled to the pulley seat 138 such that the chain pulley 140 is free to rotate relative to the pulley seat 138 to reduce wear on the chain pulley 140 while still permitting pedaling of the pedals 144 to provide an experience on snow simulating the experience of pedaling a conventional wheeled bicycle.

In use, the appropriate size of front axle mount 70 and rear axle mount 130 are selected for the particular size of front forks 46 and rear dropouts 106 of the bicycle 48. The axle mounts 70 and 130 are then attached to the bicycle 48 using nuts 146. The chain 142 is positioned on the chain pulley 140 during installation to provide resistance to pedaling sufficient to provide a rider with a conventional wheeled bike experience while skiing on snow. Thus, a rider may position his or her feet in a familiar biking position as desired during use. The bicycle 48 is then used for downhill skiing as desired by the user. After use of the ski assembly 10, the front ski 12 and rear ski 14 are easily removed and replaced by the conventional wheels of the bicycle.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A bicycle ski attachment assembly comprising:
   an elongated front ski;
   a front ski support having a front hub;
   a front axle assembly coupled to said front hub, said front axle assembly being configured for coupling to front forks of a bicycle;
   a rear ski;
   a rear ski support having a rear hub;
   a rear axle assembly coupled to said rear hub, said rear axle assembly being configured for coupling to rear dropouts of the bicycle;
   a chain pulley coupled to said rear axle assembly, said chain pulley being configured for receiving a chain from the bicycle under tension whereby said chain pulley provides resistance to pedaling pedals on the bicycle;
   a threaded extension coupled to and extending from said rear hub;
   a pulley seat threadably coupled to said threaded extension; and
   said chain pulley being coupled to said pulley seat whereby said chain pulley is free to rotate relative to said pulley seat.

2. The assembly of claim 1, further including said front ski having a medial portion positioned between an upturned forward portion and an upturned rear portion, said medial portion having a planar upper surface, said front ski having a curved bottom surface extending between two elongated side edges, each of said elongated side edges of said front ski being configured for selectively carving into snow.

3. The assembly of claim 2, further including said rear ski having medial portion positioned between an upturned forward portion and an upturned rear portion, said medial portion of said rear ski having a planar upper surface, said rear ski having a curved bottom surface extending between two elongated side edges, each of said side edges of said rear ski being configured for selectively carving into snow.

4. The assembly of claim 1, said rear axle assembly further comprising:
   a rear axle positioned in and extending through said rear hub;
   a first coil coupled to said rear axle, said first coil having a first end abutting said rear axle and a second end abutting said rear hub whereby said first coil inhibits rotation of said rear hub relative to said rear axle in a first direction; and
   a second coil coupled to said rear axle, said second coil having a first end abutting said rear axle and a second end abutting said rear hub whereby said second coil inhibits rotation of said rear hub relative to said rear axle in a second direction.

5. The assembly of claim 1, said front axle assembly further comprising:
   a front axle positioned in and extending through said front hub;
   a first spring coupled to said front axle, said first spring having a first end abutting said front axle and a second end abutting said front hub whereby said first spring inhibits rotation of said front hub relative to said front axle in a first direction; and
   a second spring coupled to said front axle, said second spring having a first end abutting said front axle and a second end abutting said front hub whereby said second spring inhibits rotation of said front hub relative to said front axle in a second direction.

6. The assembly of claim 4, said rear axle assembly further comprising:
   a pair of rear axle nuts coupled to said rear axle;
   a pair of rear bearings coupled to said rear axle, each of said rear bearings being positioned between a tubular portion of an associated said rear axle nut and said rear hub; and
   a pair of rear axle mounts, each rear axle mount having a first end portion coupled to said rear axle and a second end portion extending outwardly from said rear axle, said second end portion being configured for fitting the rear dropouts of the bicycle.

7. The assembly of claim 5, said front axle assembly further comprising:
   a pair of front axle nuts coupled to said front axle;
   a pair of front bearings coupled to said front axle, each of said front bearings being positioned between a tubular portion of an associated said front axle nut and said front hub; and
   a pair of front axle mounts, each front axle mount having a first end portion coupled to said front axle and a second end portion extending outwardly from said front axle, said second end portion being configured for fitting the front forks of the bicycle.

8. The assembly of claim 2, said front ski support further comprising:
   a pair of coplanar front posts extending from said front hub;
   a pair of coplanar rear posts extending from said front hub, said rear posts forming an acute angle extending away from said front hub with respect to said front posts; and
   a base extending between distal ends of said front posts relative to said front hub and distal ends of said front posts relative to said front hub, said base being coupled to said planar upper surface of said medial portion of said front ski.

9. The assembly of claim 3, said rear ski support further comprising:
   a pair of coplanar front arms extending from said rear hub;
   a pair of coplanar rear arms extending from said rear hub, said rear arms forming an acute angle extending away from said rear hub with respect to said front arms; and
   a base extending between distal ends of said front arms relative to said rear hub and distal ends of said rear arms relative to said rear hub, said base being coupled to said planar upper surface of said medial portion of said rear ski.

10. A bicycle ski attachment assembly comprising:
   an elongated front ski, said front ski having a medial portion positioned between an upturned forward portion and an upturned rear portion, said medial portion having a planar upper surface, said front ski having a curved bottom surface extending between two elongated side edges, each of said elongated side edges of said front ski being configured for selectively carving into snow;
   a front ski support having a front hub, said front ski support including a pair of coplanar front posts extending from said front hub, said front ski support including a pair of coplanar rear posts extending from said front hub, said rear posts forming an acute angle extending away from said front hub with respect to said front posts, said front ski support including a base extending between distal ends of said front posts relative to said front hub and distal ends of said front posts relative to said front hub, said base being coupled to said planar upper surface of said medial portion of said front ski;
   a front axle assembly coupled to said front hub, said front axle assembly being configured for coupling to front forks of a bicycle, said front axle assembly including a front axle positioned in and extending through said front hub, said front axle assembly including a first spring coupled to said front axle, said first spring having a first end abutting said front axle and a second end abutting said front hub whereby said first spring inhibits rotation of said front hub relative to said front axle in a first direction, said front axle assembly including a second spring coupled to said front axle, said second spring having a first end abutting said front axle and a second end abutting said front hub whereby said second spring inhibits rotation of said front hub relative to said front axle in a second direction, said front axle assembly including a pair of front axle nuts coupled to said front axle, said front axle assembly including a pair of front bearings coupled to said front axle, each of said front bearings being positioned between a tubular portion of an associated said front axle nut and said front hub, said front axle assembly including a pair of front axle mounts, each front axle mount having a first end portion coupled to said front axle and a second end portion extending outwardly from said front axle, said second end portion being configured for fitting the front forks of the bicycle;
   an elongated rear ski, said rear ski having medial portion positioned between an upturned forward portion and an upturned rear portion, said medial portion of said rear ski having a planar upper surface, said rear ski having a curved bottom surface extending between two elongated side edges, each of said side edges of said rear ski being configured for selectively carving into snow;
   a rear ski support having a rear hub, said rear ski support including a pair of coplanar front arms extending from said rear hub, said rear ski support including a pair of coplanar rear arms extending from said rear hub, said rear arms forming an acute angle extending away from said rear hub with respect to said front arms, said rear ski support including a base extending between distal ends of said front arms relative to said rear hub and distal ends of said rear arms relative to said rear hub, said base being coupled to said planar upper surface of said medial portion of said rear ski;
   a rear axle assembly coupled to said rear hub, said rear axle assembly being configured for coupling to rear dropouts of the bicycle, said rear axle assembly having a rear axle positioned in and extending through said rear hub, said rear axle assembly including a first coil coupled to said rear axle, said first coil having a first end abutting said rear axle and a second end abutting said rear hub whereby said first coil inhibits rotation of said rear hub relative to said rear axle in a first direction, said rear axle assembly including a second coil coupled to said rear axle, said second coil having a first end abutting said rear axle and a second end abutting said rear hub whereby said second coil inhibits rotation of said rear hub relative to said rear axle in a second direction, said rear axle assembly including a pair of rear axle nuts coupled to said rear axle, said rear axle assembly including a pair of rear bearings coupled to said rear axle, each of said rear bearings being positioned between a tubular portion of an associated said rear axle nut and said rear hub, said rear axle assembly including a pair of rear axle mounts, each rear axle mount having a first end portion coupled to said rear axle and a second end portion extending outwardly from said rear axle, said second end portion being configured for fitting the rear dropouts of the bicycle;

a threaded extension coupled to and extending from said rear hub;

a pulley seat threadably coupled to said threaded extension; and a chain pulley coupled to said rear axle assembly, said chain pulley being configured for receiving a chain from the bicycle under tension whereby said chain pulley provides resistance to pedaling pedals on the bicycle, said chain pulley being coupled to said pulley seat whereby said chain pulley is free to rotate relative to said pulley seat.

11. A bicycle ski attachment assembly comprising:

an elongated front ski;

a front ski support having a front hub;

a front axle assembly coupled to said front hub, said front axle assembly being configured for coupling to front forks of a bicycle;

said front ski having a medial portion positioned between an upturned forward portion and an upturned rear portion, said medial portion having a planar upper surface, said front ski having a curved bottom surface extending between two elongated side edges, each of said elongated side edges of said front ski being configured for selectively carving into snow;

said front axle assembly further comprising;
  a front axle positioned in and extending through said front hub;
  a first spring coupled to said front axle, said first spring having a first end abutting said front axle and a second end abutting said front hub whereby said first spring inhibits rotation of said front hub relative to said front axle in a first direction;
  a second spring coupled to said front axle, said second spring having a first end abutting said front axle and a second end abutting said front hub whereby said second spring inhibits rotation of said front hub relative to said front axle in a second direction;
  a pair of front axle nuts coupled to said front axle;
  a pair of front bearings coupled to said front axle, each of said front bearings being positioned between a tubular portion of an associated said front axle nut and said front hub;
  a pair of front axle mounts, each front axle mount having a first end portion coupled to said front axle and a second end portion extending outwardly from said front axle, said second end portion being configured for fitting the front forks of the bicycle;

said front ski support further comprising;
  a pair of coplanar front posts extending from said front hub;
  a pair of coplanar rear posts extending from said front hub, said rear posts forming an acute angle extending away from said front hub with respect to said front posts; and
  a base extending between distal ends of said front posts relative to said front hub and distal ends of said front posts relative to said front hub, said base being coupled to said planar upper surface of said medial portion of said front ski.

* * * * *